Nov. 2, 1948.  G. E. DATH  2,452,637
FRICTION SHOCK ABSORBER
Filed Feb. 8, 1944
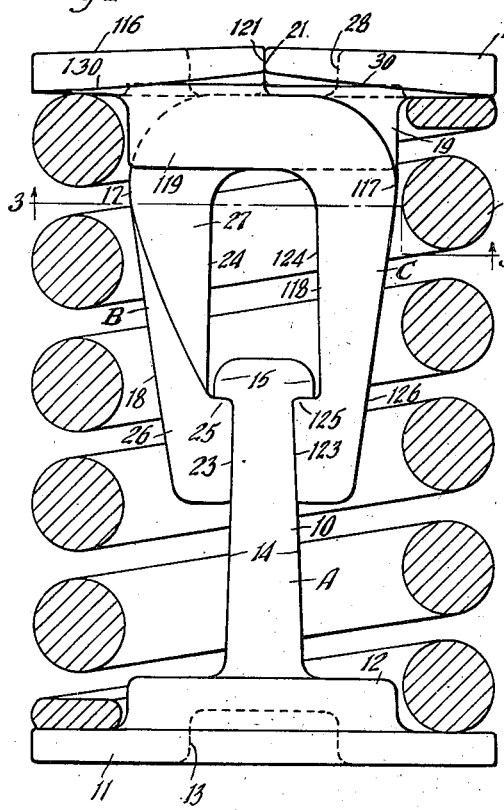
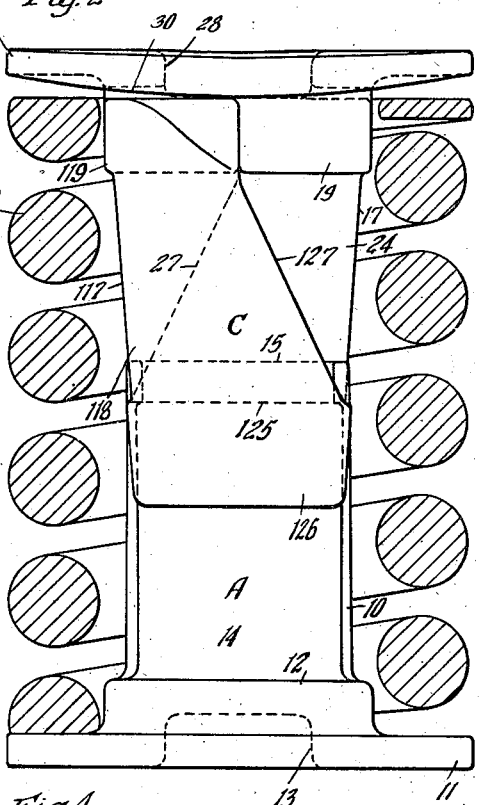
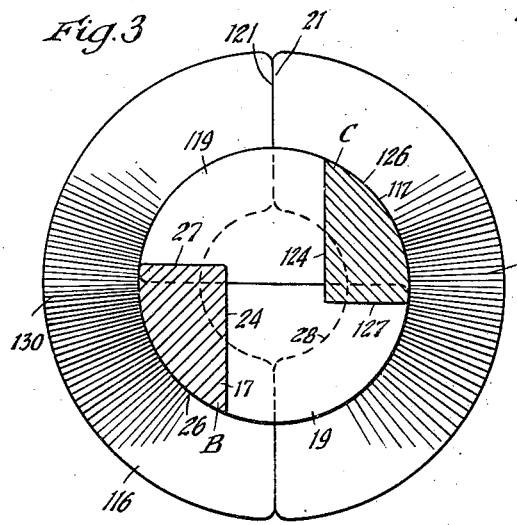
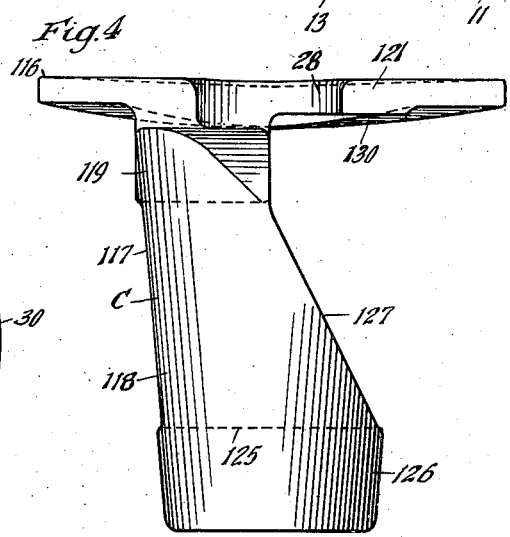
Inventor
George E. Dath
By Henry Fuchs.
Atty.

Patented Nov. 2, 1948

2,452,637

UNITED STATES PATENT OFFICE 2,452,637

FRICTION SHOCK ABSORBER

George E. Dath, Chicago, Ill., assignor to W. H. Miner, Inc., Chicago, Ill., a corporation of Delaware Application February 8, 1944, Serial No. 521,548

7 Claims. (Cl. 267—9)

This invention relates to improvements in friction shock absorbers, especially adapted for snubbing or dampening the action of the usual truck springs of railway cars.

The main object of the invention is to provide in a friction shock absorber, comprising a friction post having a follower flange at the outer end, a pair of friction shoes having sliding engagement with the post and being provided with laterally projecting follower flanges at their outer ends on which they are tiltable toward the post, and a coil spring surrounding the post and shoes and bearing at opposite ends on the flanges of the former and latter, means for assuring bearing contact of the end coils of the spring with the follower flanges of the shoes centrally between the opposite side edges of said flanges.

A more specific object of the invention is to provide means, as set forth in the preceding paragraph, comprising raised portions or crowns on the spring contacting surfaces of the follower flanges of the shoes.

Other objects of the invention will more clearly appear from the description and claims hereinafter following.

In the drawing forming a part of this specification, Figure 1 is an elevational view of my improved shock absorber, the spring member of the same being shown in vertical section. Figure 2 is a side elevational view of Figure 1, looking from right to left in said figure, the spring being shown in vertical section. Figure 3 is a transverse, horizontal, sectional view, corresponding substantially to the line 3—3 of Figure 1. Figure 4 is an elevational view of one of the friction shoes of the shock absorber, showing the shoe at the right hand side of the mechanism, as seen in Figure 1, and looking from right to left in said figure.

As shown in the drawing, my improved shock absorber comprises broadly a friction post A; two friction shoes B and C; and a spring resistance D.

The friction post A comprises a relatively wide platelike portion 10, which forms the post member proper, having a laterally projecting, annular flange 11 at the base thereof, which is in the form of a heavy disc, having an upwardly offset, central portion 12, which is formed with a central, downwardly opening recess 13 forming a seat, adapted to accommodate the usual spring centering projection of the bottom spring plate for the truck spring cluster of the railway car. The post member proper, which is upstanding from the disclike portion 11, is tapered upwardly, as clearly shown in Figure 1, thus presenting flat friction surfaces 14—14 on opposite sides thereof, which converge toward each other in upward direction. At the upper end, the post is provided with laterally, outwardly projecting, heavy flanges 15—15 at the friction surface sides thereof, forming, in effect, a head member presenting downwardly facing, horizontal stop shoulders.

The two friction shoes B and C are identical in design. Referring first to the shoe B, the same comprises a semi-circular platelike base 16 and an arm 17 formed integral with the base. The arm 17 includes a substantially vertical section 18 and a horizontal section 19 connecting the vertical section 18 to the base 16. The horizontal section extends from the lower side of the base 16. The shoe B is thus broadly of L-shaped form in elevation, the portion 18 forming the vertical section of the L and the portion 19 the horizontal section of the L. The base 16 forms, in effect, a semi-circular base flange of the shoe B, having its diametrical edge face, which is indicated by 21, at the inner side of the shoe. On the inner side, the section 18 of the arm 17 presents a flat friction surface 23 at the lower end thereof, adapted to engage one of the friction surfaces 14 of the post A, and correspondingly inclined to said surface 14. Above the surface 23, the inner side of the post is cut out, as indicated at 24, thereby providing a horizontal shoulder 25, adapted to be engaged by one of the flanges 15 of the post to limit lengthwise separation of the post and shoe. The outer side of the shoe is inclined downwardly and inwardly and the surface of said outer side is transversely curved, said outer side thus presenting a conical surface 26. The upper surface of the base plate 16 is inclined upwardly, inwardly of said plate, as shown in Figure 1, and the underneath surface thereof is crowned, as most clearly shown in Figures 1, 3, and 4, said crowned surface being indicated by 30. The crown extends circularly from one radial side edge of the plate 16 to the other radial side edge thereof, which radial side edges together form the diametrical side edge 21 of the plate. The crown 30 is of convex form, thus presenting its greatest altitude midway between the radial side edges of the plate; in other words, at a zone coinciding with a line radial to the central vertical axis of the mechanism at right angles to the diametrical side edge of said semi-circular plate 16.

Referring to the friction shoe C, which as hereinbefore stated, is identical with the shoe B, the semi-circular platelike base is indicated by 116, the arm by 117, the vertical and horizontal sections of the arm 117 by 118 and 119, respectively, the diametrical side edge of the base 116 by 121, the friction surface of the arm 117 by 123, the cut-out inner side of the arm 117 and the shoulder thereof by 124 and 125, respectively, the conical outer surface of the arm 117 by 126, and the crown of the semi-circular base 116 by 130.

The friction shoes B and C are disposed on opposite sides of the post A with the friction surfaces 23 and 123 thereof engaging the friction surfaces 14—14 of the post, the shoe B being disposed at the left hand side and the shoe C at the right hand side of the post, as seen in Figure 1. The bases 16 and 116 of the shoes have their diametrical inner side edges 21 and 121 in abutment with each other, the semi-circular base plate 16 of the shoe B being disposed at the right hand side, and the semi-circular base plate 116 of the shoe C at the left hand side of the mechanism, as seen in Figure 1. To accommodate the horizontal sections 19 and 119 of the arms 17 and 117 of the shoes B and C, and also facilitate assembling of the parts of the mechanism, the arm or plate section of each shoe is undercut at one side, the shoe B being cut out, as indicated at 27, and the shoe C, as indicated at 127. At the center of the mechanism, the base plates 16 and 116 of the two shoes B and C are provided with a seat to accommodate the usual spring centering projection or boss of the upper follower plate of the truck spring cluster, the plates 16 and 116 being recessed, as indicated at 28, to provide said seat.

The spring resistance D is in the form of a heavy coil, surrounding the post and friction shoes and bears at its top end on the crowned surfaces 30 and 130 of the base plates 16 and 116 of the shoes B and C and at its bottom end on the flange 11 of the post A. The spring D is preferably under initial compression and holds the shoes against the friction surfaces of the post A, due to the pressure exerted on the base plates or flanges 16 and 116 thereof.

As will be evident, the crowned follower plates or flanges 16 and 116 assure contact of the spring with said flanges along radial lines which are at right angles to the planes of the friction surfaces of the shoes, respectively, thereby assuring proper application of the pressure so that, when the shoes are tilted toward and away from the post, the transverse parallelism of the friction surfaces of the post and shoes will not be disturbed. In this connection it is pointed out that the crowned surfaces 30 and 130, although shown as curved or convex, may be of other contour as long as there is a raised bearing portion which is located centrally between the oppositely extending, radial edges of the semi-circular follower plates, which radial edges form the diametrical inner edges of said semi-circular plates.

In assembling the parts of my improved friction shock absorber, the shoes B and C are first placed side by side, with the diametrical edges 21 and 121 of the follower plates 16 and 116 in abutment with each other, the shoes being in inverted position with respect to that shown in Figure 1, and the plates 16 and 116 resting on a suitable support. The spring D is then placed around the shoes, resting on the base flanges or plates 16 and 116 of the shoes B and C. The post is then applied by inserting the same downwardly within the coil of the spring D and entering the same between the shoes B and C, the upper ends of which are temporarily held spread apart to admit the enlarged head portion of the post therebetween. The post is forced downwardly until the stop flanges thereof pass the shoulders 25 and 125 of the shoes. The shoulders 25 and 125 are then engaged over the flanges 15—15 of the post to hold said post and shoes against lengthwise separation.

The improved shock absorber or snubber is substituted for one or more of the spring units of a truck spring cluster, being interposed between the top and bottom spring plates of said cluster.

As will be evident to those skilled in this art, the shock absorber may be applied either in the position shown in Figure 1, or the mechanism, as a whole, may be inverted, that is, with the post at the top and the shoes at the bottom.

The operation of the improved shock absorber is as follows: Upon the cluster of springs of the railway car truck being compressed between the spring follower plates of the truck springs, the friction post A and the friction shoes B and C are moved toward each other in lengthwise direction against the resistance of the spring D. Due to the taper of the post, the cooperating ends of the shoes are spread apart and the shoes tilted on the inner edges of the semi-circular base flanges or plates 16 and 116 against the resistance of the spring D, which bears on said base plates. High frictional resistance is thus produced between the friction surfaces of the post and shoes, thereby snubbing the action of the truck springs. Compression of the mechanism is positively limited by engagement between the lower ends of the shoes and the offset 12 of the disclike follower of the post. Upon the spring follower plates being moved apart during recoil of the truck springs, the expansive action of the spring D restores all of the parts to the normal release position shown in Figure 1, separation of the post and shoes in lengthwise direction being limited by engagement of the stop flanges 15—15 of the post with the shoulders 25 and 125 of the shoes.

I have herein shown and described what I now consider the preferred manner of carrying out my invention, but the same is merely illustrative and I contemplate all changes and modifications that come within the scope of the claims appended hereto.

I claim:

1. In a friction shock absorber, the combination with a friction post; of tiltable friction shoes embracing said post at opposite sides, each shoe comprising a friction plate section having a base portion extending laterally therefrom, the base portions of said shoes comprising counterpart plate sections, said counterpart plate sections being in edge to edge engagement at their inner sides, said counterpart plate sections having crowned inner surfaces and being fulcrumed at their inner side edges, said shoes and post being slidable lengthwise with respect to each other; and a spring opposing relative movement of the shoes and post, said spring bearing on the crowns of said counterpart plate portions of the base portions of said shoes to resist tilting movement of the latter.

2. In a friction shock absorber, the combination with a friction post; of tiltable friction shoes embracing said post at opposite sides, each shoe including an upstanding friction plate section engaging the corresponding side of the post, each friction plate having a base portion projecting laterally therefrom beyond the side of the post opposite to the side engaged by said friction plate, the base portions of said shoes comprising counterpart, transversely crowned, plate sections of semi-circular shape in edge to edge contact along their diametrical side edges, said counterpart plate portions being fulcrumed at their inner ends, said shoes and post being slidable lengthwise with respect to each other; and a coil spring surrounding said post and shoes and opposing relative movement of the post and shoes in lengthwise direction, said spring bearing on the crowns of the counterpart semi-circular plate portions of the base portions of said shoes to resist tilting movement of the latter.

3. In a friction shock absorber, the combination with a friction post having a laterally projecting flange at the upper end thereof; of a pair of friction shoes embracing said post at opposite sides, each shoe having an upstanding friction plate section having a friction surface engaging the post, said shoes having counterpart base flanges at the bottom ends of the friction plates thereof projecting laterally from the friction surface sides of said friction plates respectively, said base flanges being transversely crowned on their inner sides, each shoe being tiltable about the inner end of its base flange toward and away from said post, said shoes and post being slidable with respect to each other in lengthwise direction; and a coil spring surrounding said shoes and post and bearing at its opposite ends on the flange of said post and the crowns of the base flanges of the shoes, said spring yieldingly opposing relative longitudinal movement of said post and said shoes and tilting movement of said shoes away from said post.

4. In a friction shock absorber, the combination with a vertically disposed friction post; of a pair of tiltable friction shoes embracing said post at diametrically opposite sides thereof, said shoes being movable lengthwise of the post, each shoe comprising a vertically disposed friction plate section engaging the post and having a horizontal base portion, said base portion having a horizontally disposed, peripheral, semi-annular abutment flange thereon, said semi-annular abutment flange having its upper surface crowned to present a bearing portion between the ends of said surface extending in a direction radial to the longitudinal central axis of the mechanism; and a spring opposing relative movement of the shoes and post toward each other lengthwise of the mechanism, said spring bearing on the bearing portions of the crowns of the semi-annular flanges of said shoes.

5. In a friction shock absorber, the combination with a central friction post; of tiltable friction shoes embracing said post at opposite sides thereof, each shoe comprising a friction plate section slidingly engaged with the post, and a semi-circular, laterally projecting base flange, circularly crowned on its inner side to present a bearing portion between the ends of said flange extending in a direction radially to the central longitudinal axis of the mechanism; and a coil spring opposing relative movement of the shoes and post toward each other lengthwise of the mechanism, said spring bearing on the bearing portion of the crown of the flange of each of said shoes.

6. In a friction shock absorber, the combination with a friction post having a follower section at the outer end thereof; of a pair of tiltable friction shoes embracing said post at diametrically opposite sides, said shoes being slidable lengthwise of the post; laterally outwardly projecting, transversely extending, semi-circular follower plate members on said shoes, respectively at the outer ends thereof, each follower plate member being circularly crowned on its inner side to present a bearing portion between the ends thereof which extends in a direction radially to the central longitudinal axis of the mechanism; and a coil spring surrounding said post and shoes and bearing at one end on said follower section of the post and at the other end on said bearing portions of the respective crowns of the follower plate members of said shoes.

7. In a friction shock absorber, the combination with a friction post having a follower plate section at the outer end thereof; of a pair of friction shoes embracing said post at diametrically opposite sides thereof, said shoes being slidable lengthwise of the post; laterally outwardly projecting follower flanges on said shoes, the follower flanges of said respective shoes being at said diametrically opposite sides of the post, the inner surface of the follower flange of each shoe being crowned to present a bearing portion between the ends of said surface extending in a direction radial to the longitudinal axis of the mechanism, said bearing portions of said two shoes being at diametrically opposite sides of the mechanism; and a coil spring surrounding said post and shoes and bearing at one end on the follower section of the post and at the other end on the bearing portions of the crowns of the flanges of said shoes.

GEORGE E. DATH.

REFERENCES CITED

The following references are of record in the file of this patent:

UNITED STATES PATENTS

| Number | Name | Date |
|---|---|---|
| 629,109 | McCord | July 18, 1899 |
| 882,279 | Washburn | Mar. 17, 1908 |
| 1,442,893 | Lewis | Jan. 23, 1923 |
| 2,073,761 | Shafer | Mar. 16, 1937 |
| 2,170,862 | Hobson | Aug. 29, 1939 |
| 2,355,783 | Dorey | Aug. 15, 1944 |
| 2,380,028 | Dath | July 10, 1945 |
| 2,386,107 | Geiger | Oct. 2, 1945 |